(12) United States Patent
Chen (10) Patent No.: US 7,270,306 B2
(45) Date of Patent: Sep. 18, 2007

(54) ELECTRONIC APPARATUS WITH HEIGHT-ADJUSTABLE FOOT UNIT

(75) Inventor: Chien Fu Chen, Pingtung (TW)

(73) Assignee: Benq Corporation, Taoyuan (TW)

( * ) Notice: Subject to any disclaimer, the term of this patent is extended or adjusted under 35 U.S.C. 154(b) by 18 days.

(21) Appl. No.: 11/330,860

(22) Filed: Jan. 12, 2006

(65) Prior Publication Data

US 2006/0169854 A1 Aug. 3, 2006

(51) Int. Cl.
*F16M 11/24* (2006.01)
(52) U.S. Cl. .............................. 248/188.2; 248/188.8; 248/677
(58) Field of Classification Search ................ 248/677, 248/188.2, 188.3, 188.6, 188.8, 188.9
See application file for complete search history.

(56) References Cited

U.S. PATENT DOCUMENTS

| 4,568,056 | A | * | 2/1986 | Lewinski | 248/677 |
| 4,925,137 | A | * | 5/1990 | Hastings | 248/148 |
| 5,878,983 | A | * | 3/1999 | Olson et al. | 248/188.4 |
| 6,729,590 | B2 | * | 5/2004 | Gabriel | 248/188.2 |
| 6,886,789 | B2 | * | 5/2005 | Felsenthal | 248/188.9 |
| 2003/0126972 | A1 | * | 7/2003 | Sato | 84/421 |

* cited by examiner

*Primary Examiner*—Ramon O Ramirez
(74) *Attorney, Agent, or Firm*—Snell & Wilmer L.L.P.

(57) ABSTRACT

An electronic apparatus includes a casing and an adjustable foot unit, which is disposed on the casing. The adjustable foot unit includes multiple protrusions of different lengths. When the electronic apparatus is disposed on a supporting surface, one of the multiple protrusions is selected to contact the supporting surface so that a space between the casing and the supporting surface is determined by the length of the selected protrusion.

13 Claims, 6 Drawing Sheets

ELECTRONIC APPARATUS WITH HEIGHT-ADJUSTABLE FOOT UNIT

CROSS REFERENCE TO RELATED APPLICATIONS

This application claims the right of priority based on Taiwan Patent Application No. 94100827 entitled "Electronic Apparatus with Height-adjustable Foot Support," filed on Jan. 12, 2005, which is incorporated herein by reference and assigned to the assignee herein.

FIELD OF THE INVENTION

The present invention generally relates to an electronic apparatus, and more particularly to an electronic apparatus with a height-adjustable foot unit.

BACKGROUND OF THE INVENTION

In parallel with the progress of business activities and the development of interactive learning, projectors become indispensable image forming apparatuses in many kinds of business events. There are all kinds of projectors in the market including, for example, a single lens projector, a triple-lens projector, a slide projector, a film projector, etc. One common restriction of these image forming apparatuses is that the position, such as the height, of the image forming apparatus generally requires adjustments based on the projecting environment. Therefore, there is a need to provide an image forming apparatus with height-adjustable capability so that the image display can be adjusted in accordance with the position of a target screen where the image is projected onto.

Furthermore, an image forming apparatus is generally equipped with a lens cover for protecting the lens from contaminants or damage when it is not in use. However, as the image forming apparatus is in use, the lens cover is removed from the lens and then put aside, generally resulting in the lost of the lens cover.

Therefore, it is desired to provide an image forming apparatus not only capable of being adjusted for height, but also capable of utilizing the cover to enhance the height adjustability.

SUMMARY OF THE INVENTION

One aspect of the present invention is to provide an electronic apparatus with an adjustable foot unit so that a space between the electronic apparatus and a supporting surface is adjustable based on a user's preference.

Another aspect of the present invention is to provide an image forming apparatus having a cover with extra functionality other than being a protection device for a lens in accordance with the use of the image forming apparatus. For example, as the image forming apparatus is not in use, the cover serves as a protection device for a lens. As the image forming apparatus is in use, the cover is removed from the lens and serves as an active component, instead of an inactive item (or a loose item), to facilitate the height adjustability of the image forming apparatus.

In one embodiment, the present invention provides an electronic apparatus including a casing and an adjustable foot unit. The adjustable foot unit is disposed on the casing and includes multiple protrusions of different lengths. When the electronic apparatus is disposed on a supporting surface, one of the multiple protrusions is selected to contact the supporting surface so that a space between the casing and the supporting surface is determined by the length of the selected protrusion.

In an exemplary embodiment, the adjustable foot unit includes a cylindrical body rotatably connecting to the casing. The multiple protrusions are arranged around the cylindrical body. The electronic apparatus further includes a stopper, which is disposed on the casing. The stopper is configured to engage with the cylindrical body. More particularly, the cylindrical body includes an axle, whereby the cylindrical body rotatably connects to the casing by means of the axle. Moreover, the axle includes multiple retainers respectively corresponding to the multiple protrusions so that the stopper is engaged with one of the retainers corresponding to the selected protrusion.

The electronic apparatus further includes a cover for selectively covering a portion of the electronic apparatus or being disposed between the supporting surface and the selected protrusion. In an exemplary embodiment, the cover includes a groove. When the cover is disposed between the supporting surface and the selected protrusion, the selected protrusion is wedged in the groove. Alternatively, the cover includes an engaging part and each of the multiple protrusions includes a groove. When the cover is disposed between the supporting surface and the selected protrusion, the engaging part is engaged with the groove of the selected protrusion.

BRIEF DESCRIPTION OF THE DRAWINGS

The foregoing objects and other objects together with the advantages of this invention will become more readily appreciated as the same becomes better understood by reference to the following detailed description, when taken in conjunction with the accompanying drawings, wherein.

DETAILED DESCRIPTION OF THE INVENTION

The present invention provides an electronic apparatus with a height-adjustable foot unit so that a space between the electronic apparatus and a supporting surface is adjustable based on a user's preference. Preferred embodiments of the present invention are illustrated in FIGS. 1 to 4B.

Figure 1:
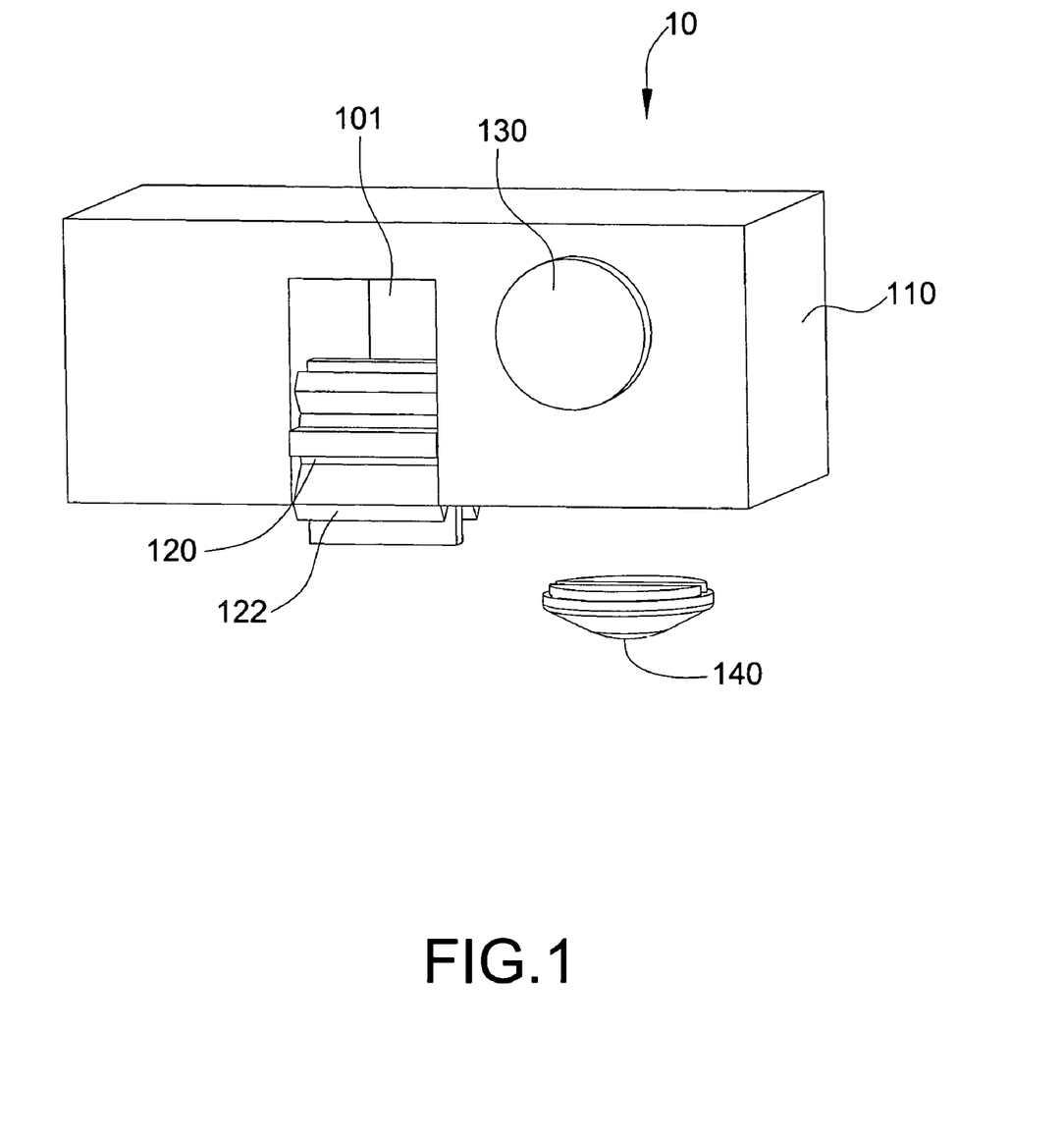
FIG. 1 is a three-dimensional schematic view of an electronic apparatus according to one embodiment of the present invention.

Referring to FIG. 1, in one embodiment, the present invention provides an electronic apparatus 10 including a casing 110 and an adjustable foot unit 120. In this embodiment, the electronic apparatus 10 can be an image forming apparatus, for example, a projector. However, in other embodiments, the electronic apparatus 10 can be any electronic apparatus required of height adjustable capability. The electronic apparatus 10, such as a projector, includes a lens 130 and a cover 140. When the projector 10 is not in use, the cover 140 generally covers the lens 130 so as to protect the lens 130 from contaminants or dusts. When the projector 10 is in use, the cover 140 is removed so that images can be projected on a target screen through the lens 130.

Figure 2A:
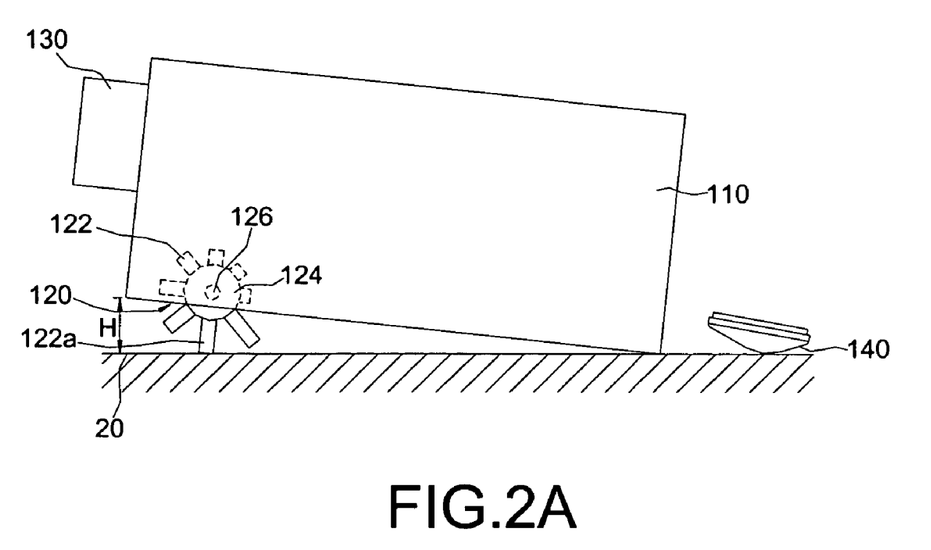
FIGS. 2A and 2B are a schematic side view and a schematic front view of the apparatus illustrated in FIG. 1, respectively.
Figure 2B:
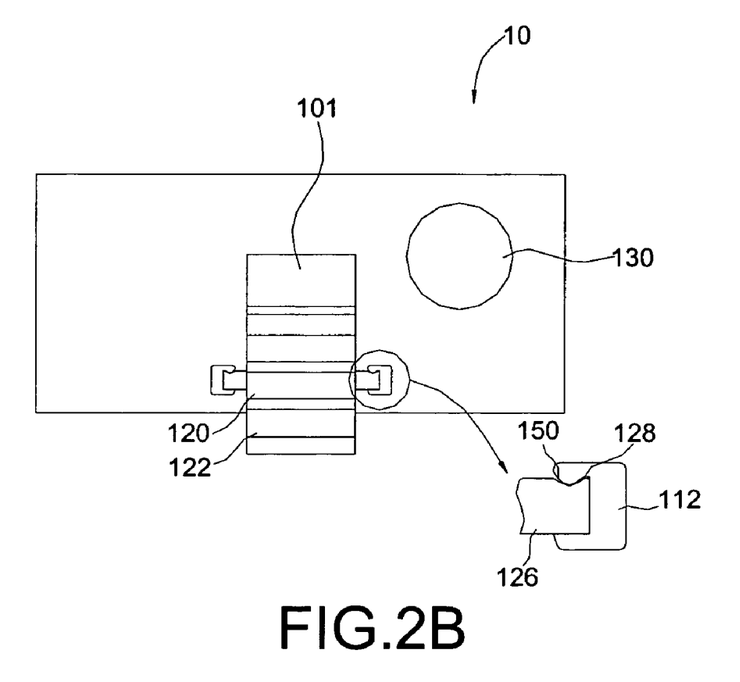

FIGS. 2A and 2B are a schematic side view and a schematic front view of the projector 10 being in use, respectively. The adjustable foot unit 120 is disposed on the casing 110 and includes multiple protrusions 122 of different lengths. When the electronic apparatus 10 is disposed on a supporting surface 20, such as a top surface of a desk, one of the multiple protrusions 122 is selected to contact the supporting surface 20 so that a space (or a distance) (H) between the casing 110 and the supporting surface 20 is determined by the length of the selected protrusion 122a. In other words, the height (or the tilt angle) of the projector 10 is determined by the length of the selected protrusion 122a. In this embodiment, the adjustable foot unit 120 includes eight protrusions of different lengths. However, any number of the protrusions can be implemented in the present invention, preferably at least two. When the projector 10 is in use, the user can select one protrusion 122a of an appropriate length from the eight protrusions 122 to contact the supporting surface 20 based on the required height of the projector 10.

As shown in FIGS. 2A and 2B, the adjustable foot unit 120 includes a cylindrical body 124 rotatably connecting to the casing 110. The multiple protrusions 122 are arranged around the cylindrical body 124. For example, the eight protrusions 122 are evenly disposed on the cylindrical body 124 along the circumferential direction. It is noted that the casing 110 is designed with a space 101 to accommodate the adjustable foot unit 120 so as to allow the protrusions 122 of different lengths to move therethrough as the cylindrical body 124 rotates. The electronic apparatus 10 further includes a stopper 150, which is disposed on the casing 110. The stopper 150 is configured to engage with the cylindrical body 124 so as to prevent undesired movements of the adjustable foot unit 120. More particularly, as shown in FIG. 2B, the cylindrical body 124 includes an axle 126. The cylindrical body 124 rotatably connects to the casing 110 by means of the axle 126. As illustrated, a connection part 112 is disposed on the casing 110, which is rotatably connected to the axle 126. The axle 126 is rotatably sleeved into the connection part 112 or rotatably engaged with the connection part 126. Furthermore, in this embodiment, the stopper 150 is disposed on the connection part 112. The stopper 150 can be a resilient portion of hook shape and be made of resilient materials, such as rubbers, plastics, or metals as appropriate. The axle 126 includes multiple retainers 128 respectively corresponding to the multiple protrusions 122. When the user exerts a force to rotate the cylindrical body 124, the stopper 150 can be released from the retainer 128 until the selected protrusion 122a is in a desired position and the cylindrical body 124 stops rotating. As a result, the stopper 150 is engaged with one of the retainers 128, which corresponds to the selected protrusion 122a. In such an arrangement, the movement of the adjustable foot unit 120 is prohibited and the selected protrusion 122a is stably positioned.

Figure 3A:
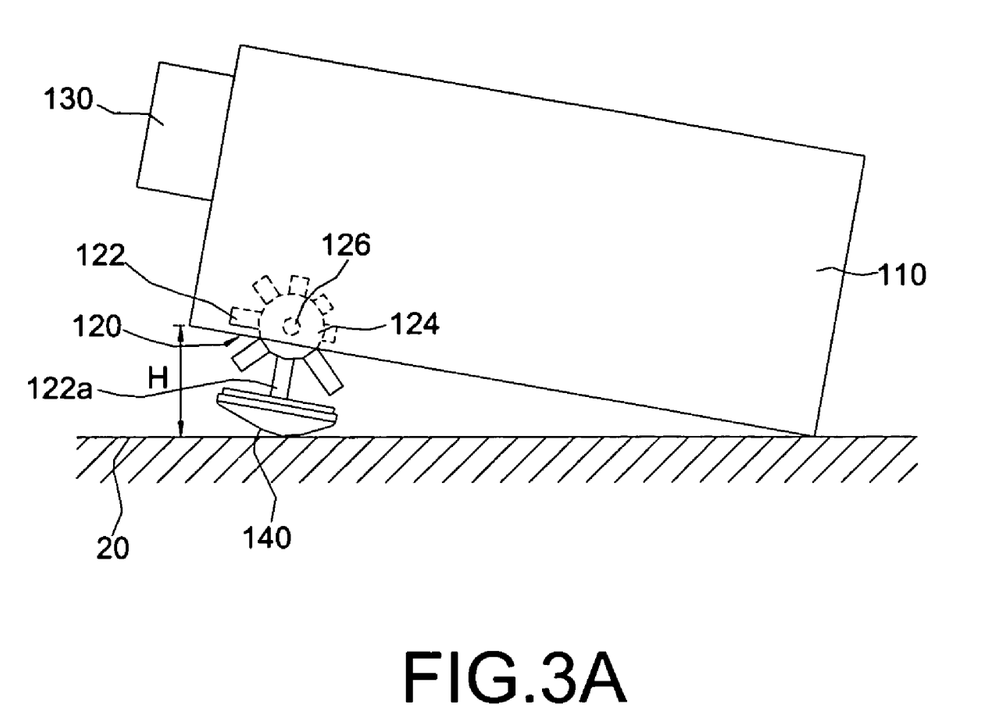
FIG. 3A is a schematic side view showing a height of an electronic apparatus is adjusted by use of a cover in accordance with one embodiment of the present invention.
Figure 3B:
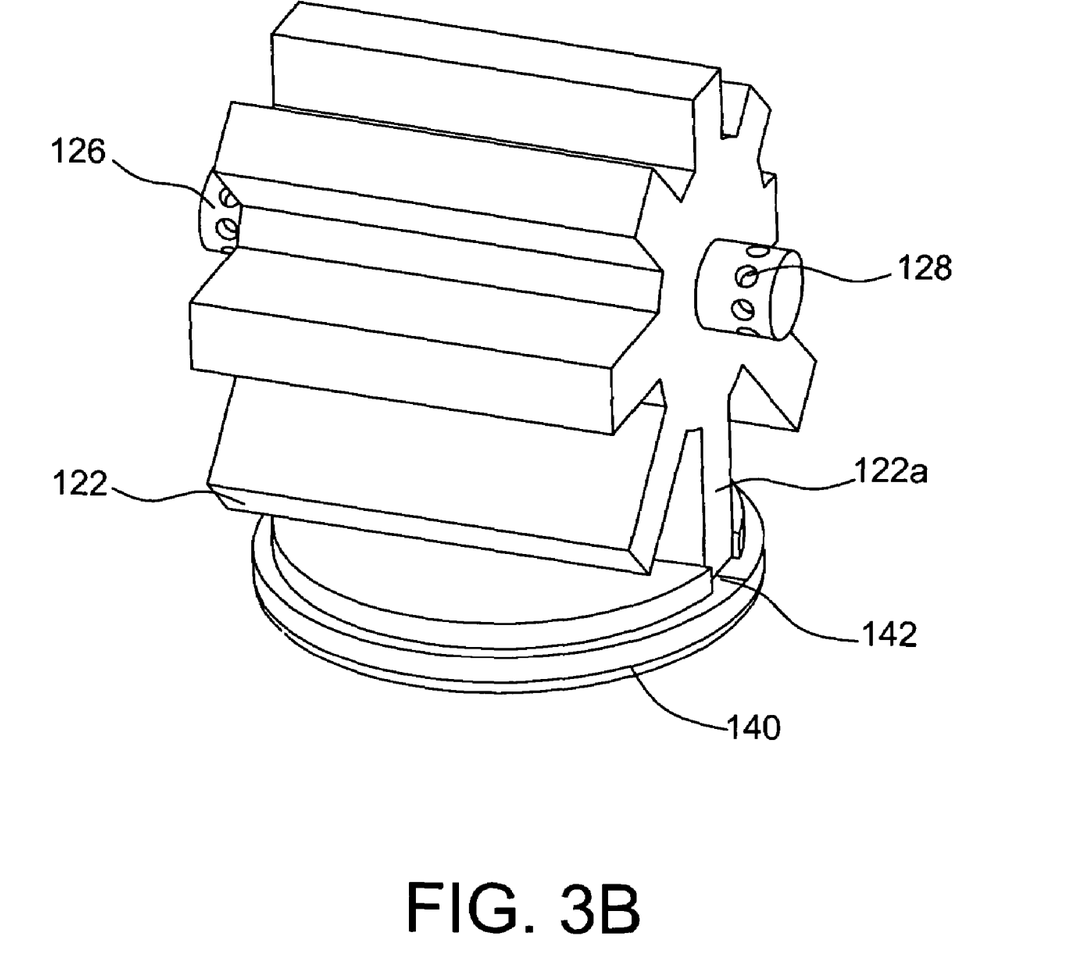
FIG. 3B is a schematic perspective view showing a cover is connected to an adjustable foot unit in accordance with one embodiment of the present invention.

Referring to FIG. 3A, a schematic side view of showing the utilization of the cover 140 to improve the height-adjustability of the electronic apparatus 10. FIG. 3B illustrates a schematic view of connecting the adjustable foot unit 120 and the cover 140. Conventionally, when the projector 10 is in use, the cover 140 is removed from the lens 130 and put aside. However, in one embodiment of the present invention, the cover 140 is disposed between the supporting surface 20 and the selected protrusion 122a of the adjustable foot unit 120 so as to improve the height adjustability. Because the cover 140 itself has a thickness, incorporating with the adjustable foot unit 120, the possible height adjustability of the electronic apparatus 10 is increased with twofold. For example, in this embodiment, eight protrusions 122 of different lengths incorporating with the cover 140 can generate up to sixteen different heights for the user to select an appropriate one when the projector is in use. As shown in FIG. 3B, the cover 140 includes a groove 142. When the cover 140 is disposed between the supporting surface 20 and the selected protrusion 122a, the selected protrusion 122a is wedged in the groove 142. In other words, the cover 140 is so designed that the groove 142 has a size about the same as the thickness of the protrusion 122. As a result, the protrusion 122 can be stably wedged in the groove 142. The cover 140 of the present invention not only serves as a protection device for the lens 130, but also functions as an auxiliary height adjustable device. Therefore, when the projector 10 is in use, the cover 140 can be an active component rather than an inactive item put aside so as to prevent the cover 140 from being lost.

Figure 4A:
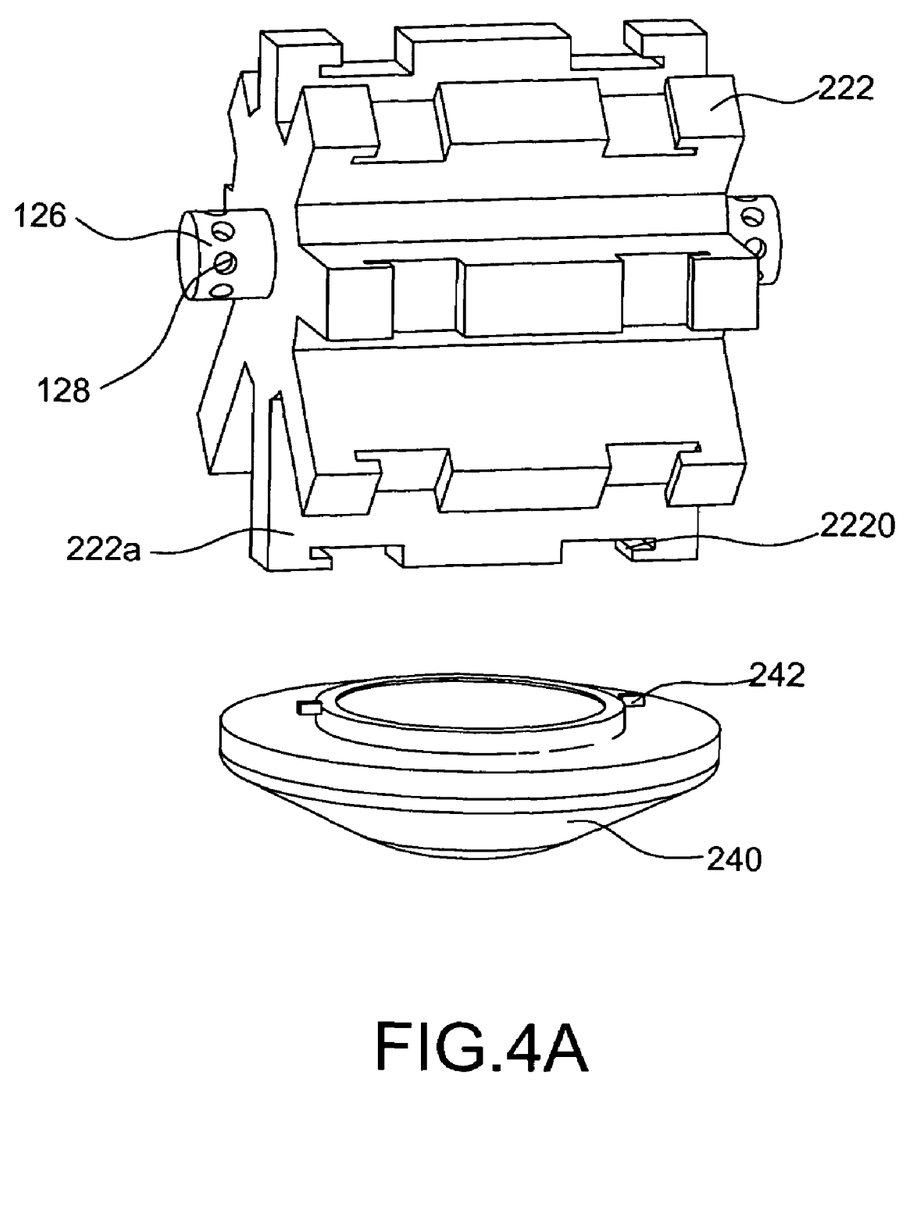
FIG. 4A is a schematic perspective view showing a cover and an adjustable foot unit in accordance with another embodiment of the present invention.
Figure 4B:
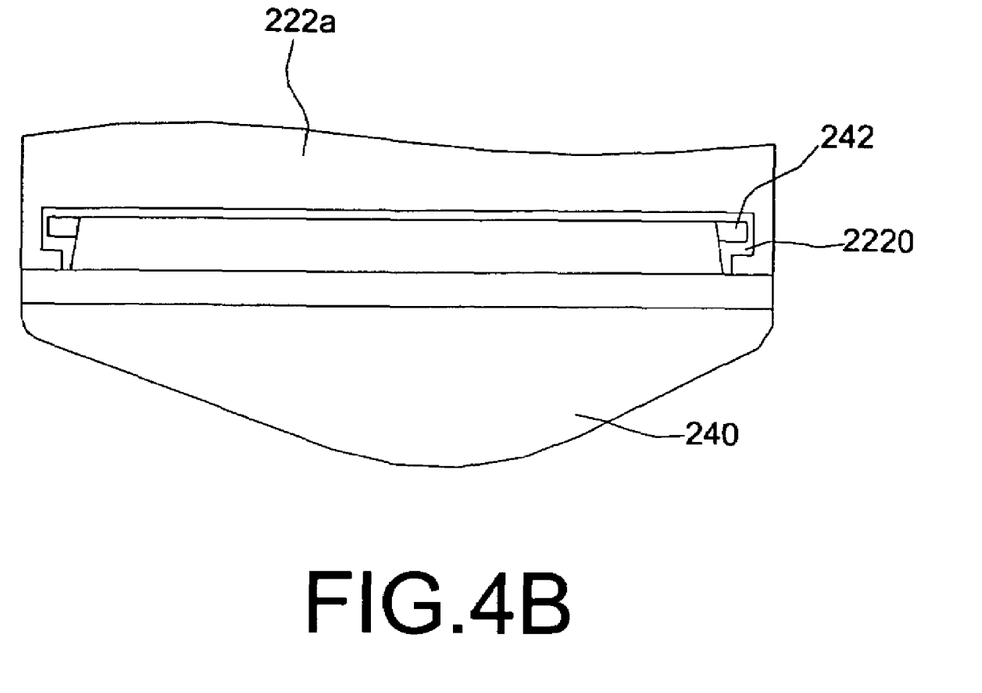
FIG. 4B is a schematic side view showing that the cover is connected to the adjustable foot unit of FIG. 4A.

It is noted that the adjustable foot unit can be engaged with the cover in various ways. As shown in FIG. 4A, in another embodiment, a cover 240 includes an engaging part 242, which is flexibly retractable. Each of the multiple protrusions 222 includes a groove 2220 corresponding to the engaging part 242. When the cover 240 is disposed between the supporting surface 20 and the selected protrusion 222a, the engaging part 242 is engaged with the groove 2220 of the selected protrusion 222a. In other words, as the cover 240 is to be engaged with the protrusion 222, the engaging part 242 is contracted to allow the cover 240 to contact with the protrusion 222. Then, the engaging part 242 is released to its original position so as to be received in the groove 2220 of the selected protrusion 222a as the cover 240 is engaged with the selected protrusion 222a. It is noted that the groove and the engaging part can have various designs and are not limited to the embodiments. For example, the protrusion can be designed with the engaging part, and the cover has the groove accordingly. Furthermore, a conventional cover can also be implemented in the present invention by modifying the design of the protrusion to cooperate with the conventional cover.

It is noted that the number of the protrusions can be modified in accordance with design requirements or cost concerns. The connection between the adjustable foot unit and the casing can be modified in accordance with different design needs. The stopper is designed to prevent the undesired movement of the adjustable foot unit when no external force is exerted.

Although specific embodiments have been illustrated and described, it will be apparent that various modifications may fall within the scope of the appended claims.

What is claimed is:

1. An electronic apparatus, comprising:
 a casing; and
 an adjustable foot unit disposed on said casing, said adjustable foot unit comprising multiple protrusions of different lengths,
  wherein when said electronic apparatus is disposed on a supporting surface, one of said multiple protrusions is selected to contact said supporting surface so that a space between said casing and said supporting surface is adjusted according to the length of the selected protrusion.

2. The electronic apparatus of claim 1, wherein said adjustable foot unit comprises a cylindrical body rotatably connecting to said casing, and said multiple protrusions are arranged around said cylindrical body.

3. The electronic apparatus of claim 2, further comprising a stopper disposed on said casing, wherein said stopper is configured to engage with said cylindrical body.

4. The electronic apparatus of claim 3, wherein said cylindrical body comprises an axle, whereby said cylindrical body rotatably connects said casing by means of said axle, and wherein said axle comprises multiple retainers respectively corresponding to said multiple protrusions so that said stopper is engaged with one of said retainers corresponding to said selected protrusion.

5. The electronic apparatus of claim 1, further comprising a cover for selectively covering a portion of said electronic apparatus or being disposed between said supporting surface and said selected protrusion.

6. The electronic apparatus of claim 5, wherein said cover comprises a groove, and when said cover is disposed between said supporting surface and said selected protrusion, said selected protrusion is wedged in said groove.

7. The electronic apparatus of claim 5, wherein said cover comprises an engaging part and each of said multiple protrusions comprises a groove so that when said cover is disposed between said supporting surface and said selected protrusion, said engaging part is engaged with said groove of said selected protrusion.

8. An electronic apparatus, comprising:
a casing comprising a connection part; and
an adjustable foot unit comprising a cylindrical body and multiple protrusions of different lengths around said cylindrical body, said cylindrical body comprising an axle for rotatably connecting to said connection part,
wherein when said electronic apparatus is disposed on a supporting surface, one of said multiple protrusions is selected to contact said supporting surface so that a space between said casing and said supporting surface is determined by the length of said selected protrusion.

9. The electronic apparatus of claim 8, further comprising a stopper disposed on said casing, wherein said stopper is configured to engage with said cylindrical body.

10. The electronic apparatus of claim 9, wherein said axle comprises multiple retainers respectively corresponding to said multiple protrusions so that said stopper is engaged with one of said retainers corresponding to said selected protrusion.

11. The electronic apparatus of claim 8, further comprising a cover for selectively covering a portion of said electronic apparatus and being disposed between said supporting surface and said selected protrusion.

12. The electronic apparatus of claim 11, wherein said cover comprises a groove, and when said cover is disposed between said supporting surface and said selected protrusion, said selected protrusion is wedged in said groove.

13. The electronic apparatus of claim 11, wherein said cover comprises an engaging part and each of said multiple protrusions comprises a groove so that when said cover is disposed between said supporting surface and said selected protrusion, said engaging part is engaged with said groove of said selected protrusion.

* * * * *

UNITED STATES PATENT AND TRADEMARK OFFICE
CERTIFICATE OF CORRECTION

PATENT NO.        : 7,270,306 B2                                        Page 1 of 1
APPLICATION NO.   : 11/330860
DATED             : September 18, 2007
INVENTOR(S)       : Chien Fu Chen

It is certified that error appears in the above-identified patent and that said Letters Patent is hereby corrected as shown below:

Title page, item [63]

Taiwan Patent Application No. 094100827 filed on January 12, 2005

Signed and Sealed this

Thirteenth Day of May, 2008

JON W. DUDAS
*Director of the United States Patent and Trademark Office*